J. L. HULBERT.
MILKING MACHINE.
APPLICATION FILED JUNE 30, 1911.

1,070,134.

Patented Aug. 12, 1913.
2 SHEETS—SHEET 1.

WITNESSES:

INVENTOR

BY

ATTORNEYS.

UNITED STATES PATENT OFFICE.

JOHN L. HULBERT, OF POUGHKEEPSIE, NEW YORK, ASSIGNOR TO THE DE LAVAL SEPARATOR COMPANY, A CORPORATION OF NEW JERSEY.

MILKING-MACHINE.

1,070,134.  Specification of Letters Patent.  Patented Aug. 12, 1913.

Application filed June 30, 1911. Serial No. 636,144.

*To all whom it may concern:*

Be it known that I, JOHN L. HULBERT, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention consists in certain improvements in milking machines whereby a more efficient result is obtained.

My invention relates to a milking machine which is provided with teat cups each of which contains an inflatable cushion or cushions. By admitting air to and exhausting it from these inflatable cushion or cushions in each cup, a pulsation is produced. These teat cups have a conical extension from their lower end which surrounds the teat, and through which the extracted milk passes.

In my improvement the conical extensions have connecting pipes which extend to a milk receiving chamber having an outlet tube. This milk chamber and its outlet tube are constantly under suction.

The drawing off of the milk by constant vacuum is more efficient than a pulsating action, because it milks more thoroughly, but on the other hand, it produces a drawing upon the teat which is irritating and hurtful. A pulsation will draw off the milk more quickly and will not draw or swell the teat, as in the case of constant vacuum. The principle of my invention is to provide a pulsating action when the flow is large, and when it grows smaller and more difficult to draw off, to decrease the pulsating action until finally when the flow reaches the smallest point *i. e.* at or about the end of the milking, it approaches a constant vacuum without any substantial pulsation which results in drawing off all the milk. This results from the arrangement, hereinafter described, where the exhaust from the cushion passes directly or indirectly through the milk receiving chamber under suction. With this arrangement, initially, when the flow of milk is free, a pulsating action of considerable amplitude is produced, but when the flow becomes small and the milk difficult to extract, the vacuum increases and the pulsating amplitude decreases. As will be seen, when treating specifically of the apparatus, this effect is produced because when the milk flows most freely, the pipe connection to the vacuum is full of milk and the air exhausted from the cushion chamber produces a pulsation of the greatest amplitude. As the flow decreases, the milk in the pipe connection becomes less and a part of the air is carried toward the vacuum and the pulsations become less, and the vacuum stronger. This continues until the final extraction of the milk, when the extraction is so difficult, and the flow so small, that practically all the exhaust air is enabled to go to the vacuum and the action on the teat becomes practically vacuum alone, there being practically no pulsation or a very low pulsation.

In my invention I start the milking initially with a pulsating action of considerable amplitude and low vacuum, and as the milking proceeds, decreasing the pulsating amplitude and increasing the strength of the vacuum. Further, with my improved apparatus, the pressure upon the lower part of the teat is less than the pressure on the upper part. If the pressure in the cushion *i. e.* the pressure on the upper part of the teat, is not greater than that on the lower part, the milk passage in the teat might be closed.

My invention also consists in certain other improvements, which generally speaking, may be stated as follows: Providing a controlling valve initially moved by a diaphragm, and subsequently by air admitted in the movement of the valve by the diaphragm. A milk chamber, an inflatable diaphragm for moving the valve, and admitting pressure to the diaphragm and exhausting into the milk chamber. Providing a milk chamber having a tube, adapted to convey milk, in connection with the teat cups, which milk chamber is under suction. A plurality of milk cups, each having an inflatable cushion or diaphragm, a single valve controlling the admission of air to all of the said cushions, and allowing the air so admitted to exhaust to a milk chamber or to the connections from the cups to the milk chamber, the milk chamber being under suction.

I will now describe the embodiments of my invention shown in the accompanying drawings, and then point out the invention in the claims.

Figures 1, 2, 3:
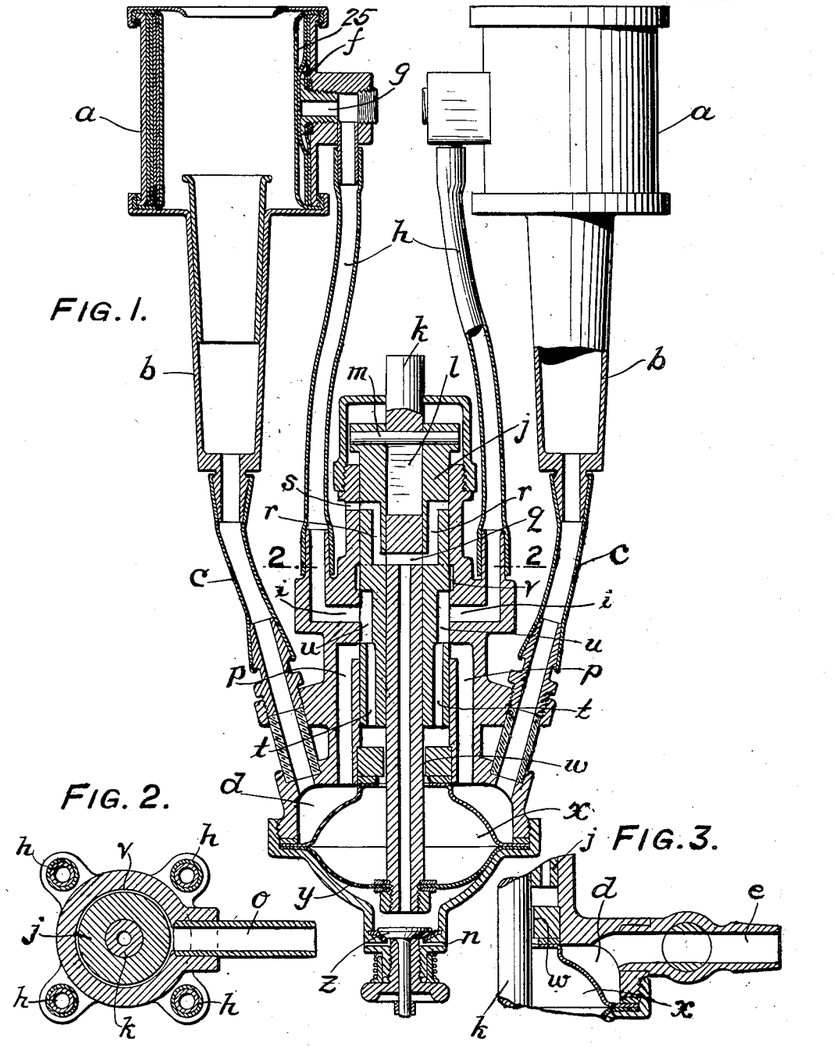
Figure 1 is a sectional view of my apparatus embodying my invention.
Fig. 2 is a cross section on line 2—2, Fig. 1.
Fig. 3 is a partial section showing outlet from milk chamber to milk receptacle.

I will first describe the construction shown in Figs. 1–3.

$a$ are the teat cups proper, having the conical extension $b$ surrounding the discharge portion of the teat connected with a flexible pipe $c$ leading to the milk receiving chamber $d$.

$e$ is the outlet pipe from the milk receiving chamber which is connected, by means of a pipe 30, with the milk receptacle 31, which, by means of a pipe 32 connected with a vacuum pump (not shown), is constantly under suction tending to produce a vacuum or partial vacuum in the milk receiving chamber, the pipe connection between the conical ends of the teat cups and the milk receiving chamber, and in the conical ends of the teat cups.

Each teat cup is provided with a lining 25. The space between the lining 25 and the inner wall of the cup forms a cushion chamber, in which is placed an inflatable bag or cushion $f$.

$g$ are inlets to the cushion chamber connected by flexible pipes $h$ with the passage $i$ in the valve casing. The valve comprises the valve proper $j$ and the hollow valve stem $k$. This valve stem has the slotted portion $l$ through which a pin $m$, connected with the valve proper, passes.

$o$ is an inlet to the valve casing from a source of pressure supply, not shown. This inlet $o$ terminates in the chamber $v$.

$p$ are passages leading from the valve casing to the milk receiving chamber.

$q$ is a passage or port through the wall of the valve stem and communicating with hollow portion of the stem.

$r$ are passages in the valve proper communicating with the exhaust port $s$.

$t$ is a passage in the valve proper and $u$ is another passage in said valve proper.

$v$ is an annular chamber in the valve casing in connection with the pressure passage. The piston stem does not make a close fit with the lower portion of the valve casing, leaving the constricted passage $w$.

$x$ is the diaphragm chamber having therein the diaphragm $y$.

$z$ is a puppet valve, in the lower portion of the diaphragm chamber $x$ controlling the port $n$.

The operation is as follows: When the valve and valve stem are at their lower position, the diaphragm chamber $x$ is by passage $w$, passage $t$ and passage $p$ in connection with the milk chamber, which being under vacuum, relieves the pressure above the diaphragm, the puppet valve lifts, and the air pressure below the diaphragm causes the diaphragm to lift, lifting the hollow valve stem with which it is connected. The stem lifts until the slot and pin connection between it and the valve proper causes the valve to lift also. The lifting of the valve brings passages $u$ and $t$ in communication with the source of pressure supply, and passage $u$ in connection with the passages $i$ leading to the teat cup cushion chambers. This admits air under pressure to the cushion chambers of the teat cups and also beneath the valve, causing it to quickly complete its movement to the top. Through the constricted passage $w$, pressure is also admitted slowly to the diaphragm chamber above the diaphragm $y$ forcing it down slowly and carrying with it the hollow valve stem $k$. This movement is partly resisted by the compression of air below the diaphragm $y$. During the downward movement of the valve stem $k$ the upper end of the slot $l$ strikes the pin $m$ at the instant that the port $q$ registers with the passage $r$. It then carries the valve proper $j$ with it. When the passage $r$ registers with the port $s$ the compression in the space below the diaphragm $y$ is relieved through the hollow stem $k$, the port $q$, passage $r$ and port $s$. A very slight further movement of the valve $j$ covers the groove $v$ and cuts off the supply of compressed air, but the expansion of that already in the space above the diaphragm completes the movement of the diaphragm and by the valve stem $k$ and pin $m$ carries the valve proper $j$ to the position where the groove $u$ communicates with passage $p$. The air from below the valve $j$ escapes to the vacuum through passages $t$ and $p$, the milk chamber $d$ and the passage $e$. Atmospheric pressure acting on top of the valve $j$ completes the valve movement and allows the air from cushions $f$ to escape to the milk chamber by way of the inlets $g$, tubes $h$, passages $i$, grooves $u$ and passage $p$. The valve is now in the original position and the cycle of operations is repeated.

The construction shown in Figs. 4–8 differs from that described specifically in the following: In the construction of these figures, the exhaust from the cushion chambers of the teat cups is into the conical lower extension of the teat cup instead of into the milk receiving chamber, but this change makes no difference in the principle of operation. Further, the valves for controlling the operation are not precisely the same. I will now describe this construction or the differences between it and the other construction. As in the construction last described, there are teat cups $a$ having an upper portion containing an inflatable cushion $f$ and a conical lower portion $b$ having a liquid pipe connection $c$ with a milk receiving chamber $d$. This milk receiving chamber $d$ has a passage $e$ leading to the milk receptacle. There is a suction constantly on the passage $e$ from a source of suction (not shown) which tends to create a vacuum or partial vacuum in the passage $e$, the milk receiving chamber $d$ and the teat cup conical lower portion $b$. In this construction instead of providing an exhaust from the inflatable cushion chamber of teat cups $a$ to the milk receiving chamber, I provide an exhaust from said chamber to the lower end of the discharge conical portion of the teat cup. The valve also is different. I will now describe these points of difference. 2 is a chamber having the port 3 controlled by the valve 4 and the exhaust port 5. In this chamber is the piston 6 connected to the rod 7. This piston has a slot 8 through which passes a pin 90 connected to the valve proper 18. 9 is the pressure inlet leading from source of pressure supply, not shown, and terminating in the annular chamber 10. 11 is a passage leading from the port 12 to the conical lower portions $b$ of the teat cups. 13 is a passage in the valve proper 18. 14 is a passage in the valve proper 18, and 15 is a contracted space between the piston rod and its bushing. 16 are passages in the valve casing, connecting through tube 26 with the cushion chambers of the teat cups $a$.

Figures 4, 5, 6, 7, 8, 9:
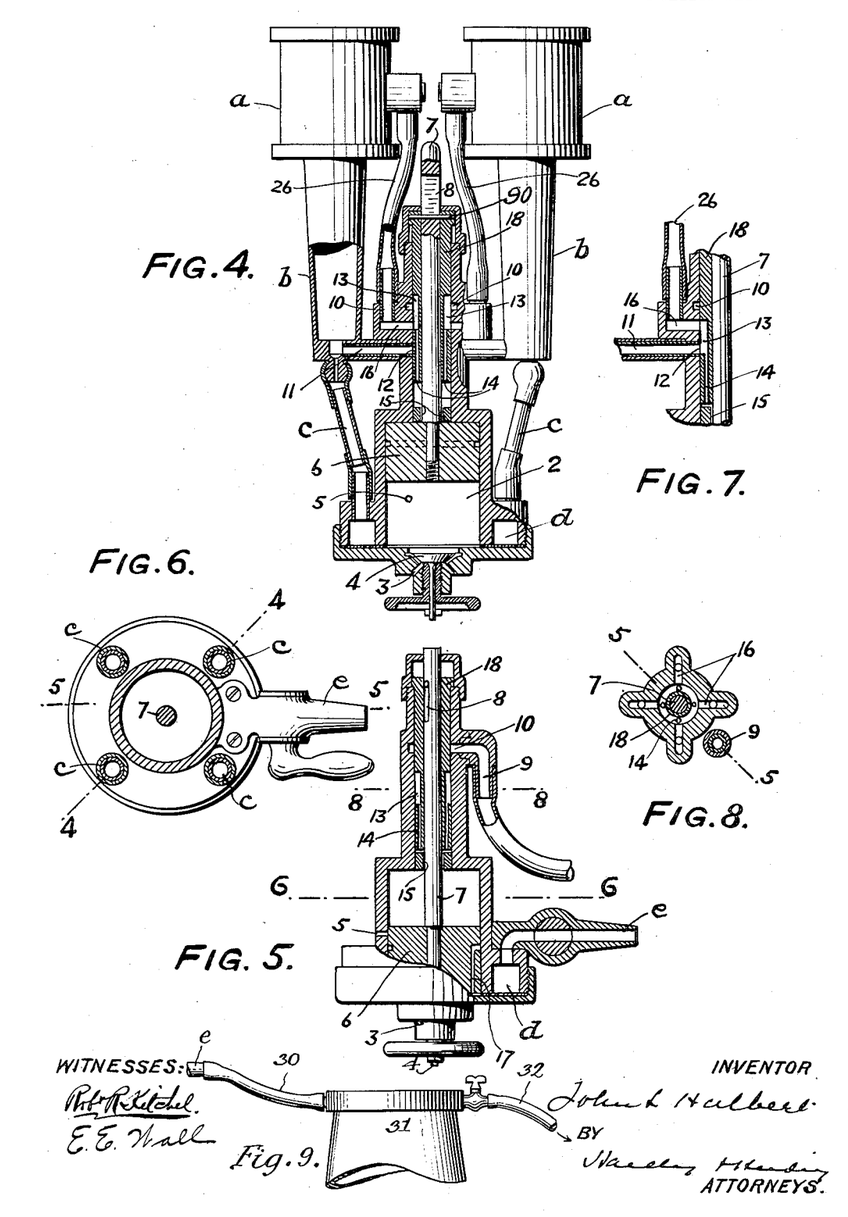
Fig. 4 is a view of another embodiment of my invention principally in central section on the line 4—4, Fig. 6.
Fig. 5 is a sectional view of a part of the form shown in Fig. 4, but taken on the line 5—5, Figs. 6 and 8.
Fig. 6 is a section on line 6—6, Fig. 5.
Fig. 7 is a view of a part of the apparatus of Fig. 4.
Fig. 8 is a section on line 8—8, Fig. 5.

In the position shown in Fig. 4, the pressure supply is connected with the pipe leading to cushion chamber of teat cups, and also to top of piston 6. When the pressure is sufficient on top of the piston 6 to move it, it and its rod 7 descend. After moving the length of the slot 8 they carry the valve 18 with them. This downward movement is retarded by the compression of air below piston 6 until passage 17 connects with port 5 and allows the air to escape. The piston then makes a quick downward movement carrying the valve 18 past the lap position. The passage 13 connects 16 and 11 (see Fig. 7), and the air in the inflatable cushion chamber exhausts into the conical discharge portions of the teat cups.

The upper portion of chamber 2 above the piston 6 is, through passages 14, 15 and 11, connected with the conical discharge portion of the teat cup, and, it being under constant suction, the air in said portion of the chamber exhausts therethrough.

When the air above the piston is exhausted, the valve is allowed to lift, admitting air through the port 3 and the piston is lifted. The first upward movement of the piston is a free movement of the rod 7, which at the end of its free movement, cuts off the connection of passages 13 and 14 with passage 11 and connects the pressure supply with passage 14, which admits air below the valve quickly, lifting the valve by the air, and admits air slowly to the top of piston. Air pressure is also admitted through passage 16 to the cushion chambers. The admission of air rapidly below the valve and slowly above the piston enables the valve to be rapidly raised to its ultimate position while the pressure above the piston is slowly accumulating to a point sufficient to cause the piston to descend. In both the construction of Figs. 1–3 and that of Figs. 4–8, by intermittently exhausting from the cushion chamber to the milk passage from the teat to the milk receptacle, a pressure is intermediately admitted to this passage. Consequently the result initially described in this specification takes place.

I do not herein claim the specific construction shown in Figs. 4–8 as the same forms the subject matter of a separate application for Letters Patent, filed of even date herewith, Serial No. 636,145.

While the outlet from the milk receiving chamber is constantly in communication with a source of suction, and while I have spoken of the milk-receiving chamber, the conical end of the teat cup, and the pipe connection $c$ between the latter and the milk-receiving chamber, as being constantly under suction, I do not mean to imply that this suction is, in all parts of the elements mentioned, effective to maintain continuously a degree of absolute pressure less than atmospheric. In fact, in the operation of the particular embodiment of my invention shown in Fig. 1, the pressure in the milk receiving chamber and in the portion of the pipe $c$ adjacent thereto will momentarily exceed atmospheric pressure at each pulsation. This condition, indeed, is perhaps necessary in order to obtain that alternate relatively high vacuum and low vacuum, at the teat cup itself, producing the pulsating action before described. When, therefore, I use the term "constantly under suction", I mean to define that condition which constantly tends to produce a vacuum or partial vacuum and do not intend to restrict the invention to a condition in which that tendency is constantly operative to maintain such vacuum or partial vacuum throughout every part of the apparatus through which the milk passes from the teat to the milk receptacle.

The method herein described is not herein claimed, as the same forms the subject matter of Letters Patent issued to me October 29, 1912, No. 1,043,013, the application for which is a division of this case.

Having now fully described my invention, what I claim and desire to protect by Letters Patent is:

1. In a milking machine, in combination, a teat cup, a passage for the milk constantly under and in communication with a source of suction, said passage leading from the milk discharge portion of the teat, means to intermittently compress the teat, and means to intermittently admit pressure fluid into said milk passage, between the teat discharge and the source of suction, alternately with the compression of the teat.

2. In a milking machine, in combination, a teat cup having an upper portion containing an inflatable cushion and a lower portion adapted to surround the milk discharge portion of the teat, means to admit pressure fluid to the cushion chamber, and means to admit fluid of a lesser pressure to the lower portion of the teat cup.

3. In a milking machine, in combination, a teat cup having an upper portion containing an inflatable cushion and a lower portion adapted to surround the milk discharge portion of the teat, means to alternately admit pressure fluid to the cushion chamber, and fluid of a lesser pressure to the lower portion of the teat cup.

4. In a milking machine, in combination, a teat cup having an upper portion containing an inflatable cushion and a lower portion adapted to surround the milk discharge portion of the teat, means to intermittently and alternately admit pressure fluid to the cushion chamber, and fluid of a lesser pressure to the lower portion of the teat cup.

5. In a milking machine, in combination, a teat cup having an upper portion containing an inflatable cushion and a lower portion adapted to surround the milk discharge portion of the teat, means to intermittently admit pressure fluid to the cushion chamber, and means to intermittently admit fluid of a lesser pressure to the lower portion of the teat cup.

6. In a milking machine, in combination, a teat cup having an upper portion containing an inflatable cushion and a lower portion adapted to surround the milk discharge portion of the teat, a liquid discharge passage, constantly under suction, from the lower portion of the teat cup, means to intermittently admit pressure fluid to said discharge passage between the teat discharge point and the suction.

7. In a milking machine, in combination, a teat cup having an upper portion containing a cushion and a lower portion adapted to surround the milk discharge portion of the teat, and means to intermittently admit pressure to the cushion chamber and exhaust therefrom to the liquid passage between the teat discharge point and the suction.

8. In a milking machine, in combination, a teat cup, a milk receptacle constantly under and in communication with a source of suction, means to intermittently compress the teat, a constantly open passage for the milk between the discharge portion of the teat and the milk receptacle, and means automatically to intermittently admit pressure fluid into said milk passage, alternately with the compression of the teat.

9. In a milking machine, in combination, a teat cup having a portion adapted to surround the discharge portion of a teat, means for intermittently compressing the base of the teat, a milk receiving chamber, a constantly open passage leading from the teat cup to the milk receiving chamber, a milk receptacle constantly under and in communication with a source of suction, a constantly open passage between the milk receiving chamber and the milk receptacle, and means automatically to intermittently admit pressure fluid to the milk receiving chamber alternately with the compression of the base of the teat.

10. In a milking machine, in combination, a teat cup, means for forcing milk out of the teat, a milk receptacle constantly under and in communication with a source of suction, a constantly open milk discharge passage between the discharge portion of the teat cup and milk receptacle, and means connecting with said passage between the teat cup and the milk receptacle automatically to produce pulsations in the discharge portion of the teat cup and to produce during each pulsation the minimum absolute pressure simultaneously with the forcing of the milk from the teat.

11. In a milking machine, in combination, a teat cup having an upper portion containing a cushion and a lower portion adapted to surround the milk discharge portion of the teat, a liquid discharge passage, constantly under suction, from the lower portion of the teat cup, and means to intermittently admit pressure fluid to said discharge passage.

12. In a milking machine, in combination, a teat cup having an upper portion containing a cushion and a lower portion adapted to surround the milk discharge portion of the teat, and means to intermittently admit pressure to the cushion chamber and exhaust therefrom to the liquid passage.

13. In a milking machine, in combination, a teat cup having an upper portion containing a cushion, and a lower portion adapted to surround the discharge portion of the teat, a milk receiving chamber constantly under suction, a liquid connection between said lower portion of the teat cup and the receiving chamber, means to intermittently admit pressure to the cushion chamber and exhaust therefrom into the milk receiving chamber.

14. In a milking machine, in combination, a valve and valve stem, a diaphragm chamber having a port to the atmosphere, a puppet valve controlling said port, a diaphragm in said chamber connected to said valve stem, a milk receiving chamber constantly under suction, a source of pressure supply, and ports and passages connecting the diaphragm chamber above the diaphragm and the source of pressure supply and the diaphragm chamber above the diaphragm and the milk receiving chamber, said passages and ports being controlled by the valve in its movement.

15. In a milking machine, in combination, a valve having a stem, a diaphragm chamber having a port to the atmosphere, a puppet valve controlling said port, a diaphragm in said chamber connected to said valve stem, a milk receiving chamber constantly under suction, a source of pressure supply, and ports and passages connecting the diaphragm chamber above the diaphragm, and the source of pressure supply, and the diaphragm chamber, above the diaphragm, and the milk receiving chamber, said ports and passages being controlled by the valve in its movement.

16. In a milking machine, in combination, a valve and a hollow valve stem, a diaphragm chamber having a port to the atmosphere, a puppet valve controlling said port, a diaphragm in said chamber connected to said valve stem, a milk receiving chamber constantly under suction, a source of pressure supply, and ports and passages connecting the diaphragm chamber above the diaphragm, and the source of pressure supply and the diaphragm chamber above the diaphragm, and the milk receiving chamber, said ports and passages being controlled by the valve in its movement, an exhaust, there being a passage through the valve stem communicating with the exhaust in the movement of the valve, said hollow valve stem communicating with the diaphragm chamber below the diaphragm.

17. In combination, a valve, a diaphragm chamber, a diaphragm in said chamber for initially moving said valve, a passage from the source of pressure supply, ports and passages adapted in the movement of the valve to connect the pressure supply passage with the space below the valve and continue the movement of said valve by said pressure.

18. In combination, a valve, a diaphragm chamber, a diaphragm in said chamber for initially moving said valve, a passage from the source of pressure supply, ports and passages adapted in the movement of the valve to connect the pressure supply passage with the space below the valve, a teat cup having an inflatable cushion, ports and passages leading from the cushion chamber of the teat cup, adapted in the movement of the valve in one direction to connect the cushion chamber of the teat cup with the pressure supply.

19. In combination, a valve, a diaphragm chamber, a diaphragm in said chamber for initially moving said valve, a passage from the source of pressure supply, ports and passages adapted in the movement of the valve to connect the pressure supply passage with the lower end of the valve, a teat cup having an inflatable cushion, ports and passages leading from the cushion chamber of the teat cup, adapted in the movement of the valve in one direction to connect the cushion chamber of the teat cup with the pressure supply, a lower extension of the teat cup surrounding the discharge portion of the teat, a liquid passage from said extension constantly under suction, ports and passages connecting the valve casing and the liquid passages between the suction and the teat discharge, the valve in the movement in the other direction connecting the passage to the cushion chamber, and the passage connecting the valve casing and the liquid discharge.

20. In a milking machine, in combination, a valve, a teat cup having an inflatable cushion portion, a passage from said cushion chamber to the valve chamber, an extension of the teat cup surrounding the discharge portion of the teat, a liquid passage from said extension constantly under suction, a passage connecting the liquid passage and the valve casing, a source of pressure supply, a passage in the valve adapted in one position of the valve to connect the pressure supply and the passage to the cushion chamber, and in another position to connect the cushion chamber passage and passage to the liquid discharge.

21. In a milking machine, in combination, a valve, a teat cup having an inflatable cushion portion, a passage from said cushion chamber to the valve chamber, an extension of the teat cup surrounding the discharge portion of the teat, a liquid passage from said extension constantly under suction, a passage connecting the liquid passage and the valve casing, a source of pressure supply, a passage adapted in one position of the valve to connect the pressure supply and the passage to the cushion chamber, and in another position to connect the cushion chamber passage and passage to the liquid discharge, a diaphragm chamber, a diaphragm in said chamber connected with the valve, a constricted passage to the diaphragm chamber above the diaphragm, a passage adapted in one position of the valve to connect the constricted passage with the pressure supply and in other positions with the passage to the liquid discharge, a port in said diaphragm chamber below the diaphragm, and a puppet valve controlling said port.

22. In a milking machine, in combination, a valve, a teat cup having an inflatable cushion portion, a passage from said cushion chamber to the valve chamber, an extension of the teat cup surrounding the discharge portion of the teat, a liquid passage from said extension constantly under suction, a passage connecting the liquid passage and the valve casing, a source of pressure supply, a passage adapted in one position of the valve to connect the pressure supply and the passage to the cushion chamber, and in another position to connect the cushion chamber passage and passage to the liquid discharge, a diaphragm chamber, a diaphragm in said chamber connected with the valve, a constricted passage to the diaphragm chamber above the diaphragm, a passage in the valve, adapted in one position to connect the constricted passage with the pressure supply and in other positions with the passage to the liquid discharge, a port in said diaphragm chamber below the diaphragm, and a puppet valve controlling said port, and a passage in the valve adapted to connect the pressure supply with the space below the valve.

23. In a milking machine, in combination, a valve, a teat cup having an inflatable cushion portion, a passage from said cushion chamber to the valve chamber, an extension of the teat cup surrounding the discharge portion of the teat, a liquid passage from said extension constantly under suction, a passage connecting the liquid passage and the valve casing, a source of pressure supply and an exhaust, a passage adapted in one position of the valve to connect the pressure supply and the passage to the cushion chamber, and in another position to connect the cushion chamber passage and passage to the liquid discharge, a diaphragm chamber, a diaphragm in said chamber, a hollow valve stem connected to said diaphragm, the hollow portion of the valve stem communicating with the diaphragm chamber below the diaphragm, a passage from the interior to the exterior of said stem and exhaust passages in the valve communicating with the passage through the valve stem and adapted in one position of the valve and stem to connect the interior of the valve with the exhaust, and a loose connection between said valve proper and valve stem, a constricted passage to the diaphragm chamber above the diaphragm, a passage in the valve, adapted in one position to connect the constricted passage with the pressure supply and in other positions with the passage to the liquid discharge, a port in said diaphragm chamber below the diaphragm and a puppet valve controlling said port.

24. In a milking machine, in combination, a valve, a teat cup having an inflatable cushion portion, a passage from said cushion chamber to the valve chamber, an extension of the teat cup surrounding the discharge portion of the teat, a liquid passage from said extension constantly under suction, a passage connecting the liquid passage and the valve casing, a source of pressure supply and an exhaust, a passage adapted in one position of the valve to connect the pressure supply and the passage to the cushion chamber, and in another position to connect the cushion chamber passage and passage to the liquid discharge, a diaphragm chamber, a diaphragm in said chamber, a hollow valve stem connected to said diaphragm, the hollow portion of the valve stem communicating with the diaphragm chamber below the diaphragm, a passage from the interior to the exterior of said stem, and exhaust passages in the valve communicating with the passage through the valve stem adapted in one position of the valve and stem to connect the interior of the valve with the exhaust, and a loose connection between said valve proper and valve stem, a constricted passage to the diaphragm chamber above the diaphragm, a passage in the valve, adapted in one position to connect the constricted passage with the pressure supply and in other positions with the passage from the liquid discharge, a port in said diaphragm chamber below the diaphragm, a puppet valve controlling said port, and a passage in the valve adapted to connect the pressure supply with the space below the valve.

25. In combination, a valve, a diaphragm chamber, a diaphragm in said chamber for initially moving said valve, a passage from the source of pressure supply, ports and passages adapted in the movement of the valve to connect the pressure supply passage with the space below the valve, a teat cup having an inflatable cushion, ports and passages leading from the cushion chamber of the teat cup to the valve casing, adapted in the movement of the valve in one direction to connect the cushion chamber of the teat cup with the pressure supply, a lower extension of the teat cup surrounding the discharge portion of the teat, a milk receiving chamber, a pipe leading from the lower extension of said teat cup to said milk chamber, a pipe leading from said milk chamber, said last mentioned pipe being constantly under vacuum, ports and passages connecting the valve casing and the milk chamber, the valve in the movement in the other direction connecting the passage to the cushion chamber and the passages connecting the valve casing and the milk chamber.

26. In a milking machine, in combination, a valve, a teat cup having an inflatable cushion portion, a passage from said cushion chamber to the valve chamber, an extension of the teat cup surrounding the discharge portion of the teat, a milk chamber having an inlet passage from the teat cup extension and an outlet passage therefrom constantly under suction, a passage connecting the milk chamber and the valve casing, a source of pressure supply, a passage adapted in one position of the valve to connect the pressure supply and the passage to the cushion chamber, and in another position to connect the cushion chamber passage and passage to the milk chamber.

27. In a milking machine, in combination, a valve, a teat cup having an inflatable cushion portion, a passage from said cushion chamber to the valve chamber, an extension of the teat cup surrounding the discharge portion of the teat, a milk receiving chamber having an inlet passage from the teat cup extension and an outlet passage therefrom constantly under suction, a passage connecting the milk receiving chamber and the valve casing, a source of pressure supply, a passage adapted in one position of the valve to connect the pressure supply and the passage to the cushion chamber, and in another position to connect the cushion chamber passage and passage to the milk chamber, a diaphragm chamber, a diaphragm in said chamber connected with the valve, a constricted passage to the diaphragm chamber above the diaphragm, a passage adapted in one position of the valve to connect the constricted passage with the pressure supply and in other positions with the passage to the milk receiving chamber, a port in said diaphragm chamber below the diaphragm, and a puppet valve controlling said port.

28. In a milking machine, in combination, a valve, a teat cup having an inflatable cushion portion, a passage from said cushion chamber to the valve chamber, an extension of the teat cup surrounding the discharge portion of the teat, a milk receiving chamber having an inlet passage from the teat cup extension and an outlet passage therefrom constantly under suction, a passage connecting the milk chamber and the valve casing, a source of pressure supply, a passage in the valve adapted in one position of the valve to connect the pressure supply and the passage to the cushion chamber, and in another position to connect the cushion chamber passage and passage to the milk chamber, a diaphragm chamber, a diaphragm in said chamber connected with the valve, a constricted passage to the diaphragm chamber above the diaphragm, a passage adapted in one position of the valve to connect the constricted passage with the pressure supply and in other positions with the passage to the liquid discharge, a port in said diaphragm chamber below the diaphragm, a puppet valve controlling said port, and a passage adapted to connect the pressure supply with the space below the valve.

29. In a milking machine, in combination, a valve, a teat cup having an inflatable cushion portion, a passage from said cushion chamber to the valve chamber, an extension of the teat cup surrounding the discharge portion of the teat, a milk receiving chamber having an inlet passage from the teat cup extension and an outlet passage therefrom, constantly under suction, a passage connecting the milk chamber and the valve casing, a source of pressure supply and an exhaust, a passage adapted in one position of the valve to connect the pressure supply and the passage to the cushion chamber, and in another position to connect the cushion chamber passage and passage to the milk chamber, a diaphragm chamber, a diaphragm in said chamber, a hollow valve stem connected to said diaphragm, the hollow portion of the valve stem communicating with the diaphragm chamber below the diaphragm, a passage from the interior to the exterior of said stem, an exhaust passage in the valve communicating with the passage through the valve stem, and adapted in one position of the valve and stem to connect the interior of the valve with the exhaust, and a loose connection between said valve proper and valve stem, a constricted passage to the diaphragm chamber above the diaphragm, a passage adapted in one position of the valve to connect the constricted passage with the pressure supply and in other positions with the passage to the milk receiving chamber, a port in said diaphragm chamber below the diaphragm, and a puppet valve controlling said port.

30. In a milking machine, in combination, a valve, a teat cup having an inflatable cushion portion, a passage from said cushion chamber to the valve chamber, an extension of the teat cup surrounding the discharge portion of the teat, a milk chamber having an inlet passage from the teat cup extension and an outlet passage therefrom constantly under suction, a passage connecting the milk chamber and the valve casing, a source of pressure supply and an exhaust, a passage adapted in one position of the valve to connect the pressure supply and the passage to the cushion chamber, and in another position to connect the cushion chamber passage and passage to the milk chamber, a diaphragm chamber, a diaphragm in said chamber, a hollow valve stem connected to said diaphragm, the hollow portion of the valve stem communicating with the diaphragm chamber below the diaphragm, a passage from the interior to the exterior of said stem, an exhaust passage in the valve communicating with the passage through the valve stem, and adapted in one position of the valve and stem to connect the interior of the valve with the exhaust, a loose connection between said valve proper and valve stem, a constricted passage to the diaphragm chamber above the diaphragm, a passage adapted in one position of the valve to connect the constricted passage with the pressure supply and in another position with the passage to the milking chamber, a port in said diaphragm chamber below the diaphragm, and a puppet valve controlling said port, and a passage in the valve adapted to connect the pressure supply with the space below the valve.

31. In a milking machine, in combination, a plurality of teat cups each having an inflatable cushion, and an extension surrounding the discharge portion of the teat, a milk chamber and liquid connection from all the teat cups to said milk chamber, a source of pressure supply, a single valve and passages thereto from the pressure supply, the cushion chambers of the teat cups and the milk chamber, the valve in its movement alternately connecting the cushion chambers with the pressure and with the milk chamber, the milk chamber being constantly under suction.

32. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chambers with the pressure and with the milk chamber, the milk chamber being constantly under suction, a diaphragm chamber, a diaphragm therein connected with the valve, ports and passages whereby in the movement of the valve pressure is alternately admitted to and exhausted from the diaphragm chamber above the diaphragm.

33. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chambers with the pressure and with the milk chamber, the milk chamber being constantly under suction, a diaphragm chamber, a diaphragm therein connected with the valve, ports and passages whereby in the movement of the valve pressure is alternately admitted to the diaphragm chamber above the diaphragm and exhausted therefrom to the milk chamber.

34. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chamber with the pressure and with the milk chamber, the milk chamber being constantly under suction, a diaphragm chamber, a diaphragm therein connected with the valve, ports and passages whereby in the movement of the valve pressure is alternately admitted to and exhausted from the diaphragm chamber above the diaphragm, a port in said diaphragm chamber below the diaphragm, a puppet valve controlling said port, an exhaust and ports and passages adapted in the movement of the valve to connect the diaphragm chamber below the diaphragm with the exhaust.

35. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chamber with the pressure and with the milk chamber, the milk chamber being constantly under suction, a diaphragm chamber, a diaphragm therein connected with the valve, ports and constricted passages whereby in the movement of the valve pressure is alternately admitted to and exhausted from the diaphragm chamber above the diaphragm.

36. In a milking machine, in combination, a plurality of teat cups each having an inflatable cushion, and an extension surrounding the discharge portion of the teat, a milk chamber and liquid connection from the teat cups to said milk chamber, a source of pressure supply and an exhaust, a single valve and passages thereto from the pressure supply, the cushion chambers of the teat cups and the milk chamber, the valve in its movement alternately connecting the cushion chambers with the pressure and with the milk chamber, the milk chamber being constantly under suction, a diaphragm chamber, a diaphragm therein connected with the valve, ports and passages whereby in the movement of the valve pressure is alternately admitted to and exhausted from the diaphragm chamber above the diaphragm, and a passage adapted in the movement of the valve to admit pressure below the valve.

37. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chamber with the pressure and with the milk chamber, the milk chamber being constantly under suction, a diaphragm chamber, a diaphragm therein connected with the valve, ports and passages whereby in the movement of the valve pressure is alternately admitted to and exhausted from the diaphragm chamber above the diaphragm, a port in said diaphragm chamber below the diaphragm, a puppet valve controlling said port, an exhaust and ports and passages adapted in the movement of the valve to connect the diaphragm chamber below the diaphragm with the exhaust, and a passage adapted in the movement of the valve to admit pressure below the valve.

38. In a milking machine, in combination, a plurality of teat cups each having an inflatable cushion, and an extension surrounding the discharge portion of the teat, a milk chamber and liquid connection from the teat cups to said milk chamber, a source of pressure supply, a single valve and passages thereto from the pressure supply, the cushion chambers of the teat cups and the milk chamber, the valve in its movement alternately connecting the cushion chambers with the pressure and with the milk chamber, the milk chamber being constantly under suction, a diaphragm chamber, a diaphragm therein connected with the valve, ports and passages whereby in the movement of the valve pressure is alternately admitted to and exhausted from the diaphragm chamber above the diaphragm, the passage from the diaphragm chamber being of less size than that to the milk chamber.

39. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit.

40. In a milking machine, in combination, a teat cup having an inflatable cushion chamber and an extension adapted to surround the discharge portion of the teat, a discharge conduit from said extension constantly under suction, a source of pressure supply, a valve, ports and passages leading to the valve from the pressure supply and from the valve to the cushion chamber, and discharge conduit, the valve in its movement being adapted alternately to connect the cushion chamber with the pressure supply and with the discharge conduit, a passage leading from the pressure supply to the space below the valve, the connection of which is controlled by the valve in its movement.

41. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected with the valve, a passage to the diaphragm chamber, above the diaphragm and adapted in the movement of the valve to be connected alternately with the pressure supply and with an exhaust.

42. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected to the valve, a passage to said chamber, above the diaphragm and adapted in the movement of the valve to be connected alternately with the pressure supply and with the discharge conduit.

43. In a milking machine, in combination, a teat cup having an inflatable cushion chamber and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a passage leading from the pressure supply to the space below the valve, the connection of which is controlled by the valve in its movement, a diaphragm chamber, a diaphragm in said chamber connected to the valve, a passage to said chamber above the diaphragm adapted in the movement of the valve to be connected alternately with the pressure supply and with an exhaust.

44. In a milking machine, in combination, a teat cup having an inflatable cushion chamber and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a passage leading from the pressure supply to the space below the valve, the connection of which is controlled by the valve in its movement, a diaphragm chamber, a diaphragm in said chamber connected to the valve, a passage to said chamber above the diaphragm adapted in the movement of the valve to be connected alternately with the pressure supply and with said discharge conduit.

45. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected with the valve, a passage to said chamber, above the diaphragm and adapted in the movement of the valve to be connected alternately with the pressure supply and with an exhaust, the passage to the diaphragm chamber being a constricted one.

46. In a milking machine, in combination, a teat cup having an inflatable cushion chamber and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a passage leading from the pressure supply to the space below the valve, the connection of which is controlled by the valve in its movement, a diaphragm chamber, a diaphragm in said chamber connected to the valve, a passage from the space below the valve to passage from the space below the valve to said chamber above the diaphragm and adapted in the movement of the valve to be connected alternately with the pressure supply and with an exhaust, the passage to the diaphragm chamber being of less size than the passages leading to the lower portion of the valve and to the exhaust.

47. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected to the valve, a passage to said chamber, above the diaphragm adapted in the movement of the valve to be connected alternately with the pressure supply and with an exhaust, means to exhaust pressure from and admit pressure to the diaphragm chamber below the diaphragm.

48. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected to the valve, a passage to the chamber, above the diaphragm and adapted in the movement of the valve to be connected alternately with the pressure supply and with an exhaust, means to exhaust pressure from and admit pressure to the diaphragm chamber below the diaphragm, a valve stem connected to said diaphragm, and a loose connection between said stem and the valve proper.

49. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber, a passage to said chamber, above the diaphragm and adapted in the movement of the valve to be connected alternately with the pressure supply and with an exhaust, a valve stem, said stem connected to the diaphragm and having a hollow central portion and a passage through the stem communicating therewith, and passages in connection with an exhaust adapted, in the movement of the valve, to be connected with said passage through the stem, the hollow portion of the stem opening into the diaphragm chamber below the diaphragm, there being a port in the diaphragm chamber below the diaphragm, and a puppet valve controlling said port.

50. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber connected with the valve, and a passage to said chamber, above the diaphragm adapted in the movement of the valve to be connected alternately with the pressure supply and with discharge conduit, means to exhaust pressure from and admit pressure to the diaphragm chamber below the diaphragm.

51. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber, a passage to said chamber, above the diaphragm adapted in the movement of the valve to be connected alternately with the pressure supply and with the discharge conduit, means to exhaust pressure from and admit pressure to the diaphragm chamber below the diaphragm, a valve stem connected to said diaphragm and a loose connection between said stem and the valve proper.

52. In a milking machine, in combination, a teat cup having an inflatable cushion chamber, and an extension adapted to surround the discharge portion of the teat, a discharge conduit from said extension constantly under suction, a source of pressure supply, a valve, ports and passages leading to the valve from the pressure supply and from the valve to the cushion chamber and discharge conduit, the valve in its movement being adapted alternately to connect the cushion chamber with the pressure supply and with the discharge conduit, a diaphragm chamber, a diaphragm in said chamber, a passage to said chamber, above the diaphragm adapted in the movement of the valve, to be connected alternately with the pressure supply and with the discharge conduit, a valve stem connected to said diaphragm, and loose connection between said stem and the valve proper, said stem having a hollow central portion, and a passage through the stem communicating therewith, and passages in connection with an exhaust adapted, in the movement of the valve, to be connected with said passage through the stem, the hollow portion of the stem opening into the diaphragm chamber below the diaphragm, there being a port in the diaphragm chamber below the diaphragm, and a puppet valve controlling said port.

53. In a milking machine, in combination, a milk discharge passage, means to connect the milk discharge passage with the discharge portion of the teat, said passage being constantly under suction, and means to produce pulsations in said discharge passage, the amplitude of which are directly as the flow of the milk.

54. In a milking machine, in combination, a milk discharge passage, means to connect the milk discharge passage with the discharge portion of the teat, said passage being constantly under suction, and means to produce pulsations directly as, and tending to vary the suction in said discharge passage inversely as the flow of the milk.

55. In a milking machine, in combination, a milk discharge passage, means to connect the milk discharge passage with the discharge portion of the teat, said passage being constantly under suction, and means to produce pulsations in said discharge passage, varying in amplitude directly as the flow of the milk, and varying the suction inversely as said flow of the milk.

56. In a milking machine, in combination, a milk discharge pipe, means to connect the milk discharge pipe with the discharge portion of the teat, said discharge pipe being constantly under suction, and means exterior to but connected with said discharge pipe and teat connecting means tending to vary the suction inversely as the flow of the milk.

57. In a milking machine, in combination, a teat cup; a free and unobstructed discharge from the teat cup comprising a milk chamber, a pipe connecting the teat cup and milk chamber and an outlet pipe from the milk chamber; said pipes and chamber being constantly in communication with a source of suction; and means communicating with the milk chamber for producing pulsations in the milk discharge.

58. In a milking machine, in combination, a free and unobstructed milk discharge passage, means to connect the milk discharge passage with the discharge portion of the teat, said passage being constantly under suction, and means to produce pulsations in said discharge passage, the amplitude of which are directly as the flow of the milk.

59. In a milking machine, in combination, a free and unobstructed milk discharge passage, means to connect the milk discharge passage with the discharge portion of the teat, said passage being constantly under suction, and means to produce pulsations directly as, and tending to vary the suction in said discharge passage inversely as the flow of the milk.

60. In a milking machine, in combination, a free and unobstructed milk discharge passage, means to connect the milk discharge passage with the discharge portion of the teat, said passage being constantly under suction, and means to produce pulsations in said discharge passage, varying in amplitude directly as the flow of the milk, and varying the suction inversely as said flow of the milk.

61. In a milking machine, in combination, a milk discharge pipe and means to connect the same with the discharge portion of the teat, said discharge being free and unrestricted and being constantly under suction, and means exterior to but connected with said discharge pipe and teat connecting means tending to vary the suction inversely as the flow of the milk.

62. In a milking machine, in combination, a teat cup, a milk discharge from said teat cup constantly under and in communication with a source of suction, and means independent of the suction and automatically to produce pulsations in said discharge.

63. In a milking machine, in combination, a teat cup, a milk discharge from said teat cup constantly under suction, means to produce pulsations in said discharge, the amplitude of which are directly as the flow of the milk.

64. In a milking machine, in combination, a teat cup, a milk discharge from said teat cup constantly under suction, and means to produce pulsations directly as, and tending to vary the suction in said discharge inversely as the flow of the milk.

65. In a milking machine, in combination, a teat cup, a milk discharge from said teat cup constantly under suction, means to produce pulsations in said discharge varying in amplitude directly as the flow of the milk and varying the suction inversely as said flow of the milk.

66. In a milking machine, in combination, a teat cup, a milk discharge from said teat cup constantly under suction, and means exterior to the teat cup tending to vary the suction inversely as the flow of the milk.

67. In a milking machine, in combination, a teat cup, a cushion therein, a portion of said cup adapted to surround the discharge of the teat, a milk discharge passage from said last mentioned portion, said passage being constantly under suction, means to produce pulsations in said discharge passage, ports and passages for admitting pressure fluid to and discharging from the cushion, a valve controlling said ports and passages, a connection between said valve and the milk discharge passage for controlling the movement of said valve in one direction.

68. In a milking machine, in combination, a teat cup, a cushion therein, a portion of said cup adapted to surround the discharge portion of the teat, a milk discharge passage from said last mentioned portion, said passage being constantly under suction, means to produce pulsations in said discharge passage, ports and passages for admitting air to and discharging from the cushion, a valve controlling said ports and passages, a diaphragm for operating said valve, and a connection between the diaphragm chamber and the milk discharge passage for controlling the movement of the valve in one direction.

In testimony of which invention, I have hereunto set my hand, at Philadelphia, on this 28th day of June, 1911.

JOHN L. HULBERT.

Witnesses:
M. M. HAMILTON,
E. E. WALL.